United States Patent
Will et al.

(10) Patent No.: US 9,046,053 B2
(45) Date of Patent: Jun. 2, 2015

(54) PISTON WITH AN UNDERCROWN SUPPORT FEATURE

(75) Inventors: Kurt Will, Plymouth, MI (US); Marc Brandt, Wixom, MI (US); Mike Tebbe, Wixom, MI (US)

(73) Assignee: Federal-Mogul Corporation, Southfield, MI (US)

( * ) Notice: Subject to any disclaimer, the term of this patent is extended or adjusted under 35 U.S.C. 154(b) by 425 days.

(21) Appl. No.: 13/538,653

(22) Filed: Jun. 29, 2012

(65) Prior Publication Data

US 2013/0008307 A1 Jan. 10, 2013

Related U.S. Application Data

(60) Provisional application No. 61/502,604, filed on Jun. 29, 2011.

(51) Int. Cl.
| | |
|---|---|
| *F16J 1/04* | (2006.01) |
| *F02F 3/00* | (2006.01) |
| *F02F 3/24* | (2006.01) |
| *F02F 3/26* | (2006.01) |
| *F02F 3/28* | (2006.01) |
| *F16J 15/00* | (2006.01) |

(52) U.S. Cl.
CPC .................. *F02F 3/0076* (2013.01); *F02F 3/24* (2013.01); *F02F 3/26* (2013.01); *F02F 3/285* (2013.01); *F16J 15/00* (2013.01)

(58) Field of Classification Search
CPC ............. F02F 3/0076; F02F 3/24; F02F 3/26; F02F 3/285
USPC .............................. 92/208, 239; 123/279, 307
See application file for complete search history.

(56) References Cited

U.S. PATENT DOCUMENTS

| | | | |
|---|---|---|---|
| 1,281,765 | A | 10/1918 | Clark |
| 1,944,223 | A | 1/1934 | Day |
| 2,026,789 | A | 1/1936 | Long |
| 2,044,854 | A | 6/1936 | Long |
| 2,067,278 | A | 1/1937 | Nelson |
| 2,071,131 | A | 2/1937 | Long |
| 2,120,090 | A | 6/1938 | Day |

(Continued)

FOREIGN PATENT DOCUMENTS

| | | |
|---|---|---|
| EP | 0364810 A2 | 4/1990 |
| JP | 2078753 A | 3/1990 |

(Continued)

OTHER PUBLICATIONS

International Search Report PCT/US2012/044564 mailed on Oct. 23, 2012.

*Primary Examiner* — Michael Leslie

(74) *Attorney, Agent, or Firm* — Robert L. Stearns; Dickinson Wright, PLLC

(57) ABSTRACT

A piston with a piston body extending along a longitudinal central axis and having a crown portion and a pair of pin bosses is provided. The crown portion includes a combustion wall with a combustion bowl formed therein and a pair of ribs depending from the combustion wall. One of the ribs depends from the combustion wall directly below the combustion bowl, and the other rib is radially spaced from the combustion bowl. As such, one of the ribs depends lower along the longitudinal central axis than the other of the ribs. The ribs provide support to the crown portion and also act as a heat sink to extract heat from the combustion wall.

12 Claims, 3 Drawing Sheets

(56) References Cited

U.S. PATENT DOCUMENTS

| | | | |
|---|---|---|---|
| 2,136,822 A | 11/1938 | Moore | |
| 2,217,541 A | 10/1940 | Flammang et al. | |
| 2,829,017 A | 4/1958 | Turlay | |
| 4,989,559 A * | 2/1991 | Fletcher-Jones | 123/193.6 |
| 6,745,745 B2 * | 6/2004 | Huebler et al. | 123/307 |
| 7,353,797 B1 | 4/2008 | Breidenthal | |
| 2010/0065009 A1 | 3/2010 | Mukouhara et al. | |
| 2010/0139480 A1 | 6/2010 | Ohmori et al. | |
| 2010/0307446 A1 | 12/2010 | Nodl | |

FOREIGN PATENT DOCUMENTS

| | | |
|---|---|---|
| JP | 2007309271 A | 11/2007 |
| WO | 2006014741 A2 | 2/2006 |

* cited by examiner

PISTON WITH AN UNDERCROWN SUPPORT FEATURE

CROSS REFERENCE TO RELATED APPLICATION

This application claims the benefit of U.S. Provisional Application Ser. No. 61/502,604, filed Jun. 29, 2011.

BACKGROUND OF THE INVENTION

1. Field of the Invention

The present invention relates generally to pistons for internal combustion engines.

2. Related Art

In their continuing efforts to improve power production and fuel efficiency, many engine manufactures are incorporating advanced technologies such as direct injection, turbochargers and super-chargers into their gasoline-fueled engines. Often, these and other advanced technologies improve the engine's performance by increasing the pressures and temperatures of combustion within the engine's cylinder bore. However, increased pressures and temperatures could cause unwanted bending or other damage to the upper crown portions of the engine's pistons. Such damage could result in reduced performance or even total failure of the engine.

In order to strengthen their pistons to withstand the increased combustion pressures and temperatures, some piston manufacturers have begun to produce pistons with an increased combustion wall thickness. While such pistons may be resistant to bending under the increased pressures and temperatures, the increased thickness also gives the pistons an increased mass, which may detract from the power and fuel efficiency gains of from the advanced technologies.

SUMMARY OF THE INVENTION

In accordance with one aspect of the present invention, a piston is provided having a piston body which extends along a longitudinal central axis. The piston body has a crown portion with a combustion wall and a pair of pin bosses which depend from the crown portion. The crown portion includes at least two ribs formed integrally therewith with each rib depending from the combustion wall. One of the ribs depends (or extends) lower along the longitudinal central axis than the other of the ribs. The ribs enhance the strength of the upper crown to resist bending about a pin bore axis without substantially increasing the mass of the piston. Additionally, the ribs act as a heat sink to extract heat away from the combustion wall and cool the piston.

In accordance with another aspect of the invention, the ribs extend between the pin bosses and bow outwardly from the pin bore axis. Thus, the length of the ribs is increased without substantially increasing the mass of the piston.

In accordance with yet another aspect of the invention, a piston is provided including a piston body extending along a longitudinal central axis and having a crown portion with a combustion wall and a pair of pin bosses depending generally from the crown portion. The combustion wall includes at least one combustion bowl formed therein, and the crown portion includes at least one rib formed integrally therewith and depending from the combustion bowl directly beneath the at least one combustion bowl. Thus, the at least one rib enhances the strength of the upper crown at the location of the combustion bowl, which often is located at the center of the combustion in the cylinder bore.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DESCRIPTION OF THE ENABLING EMBODIMENT

Figure 1:
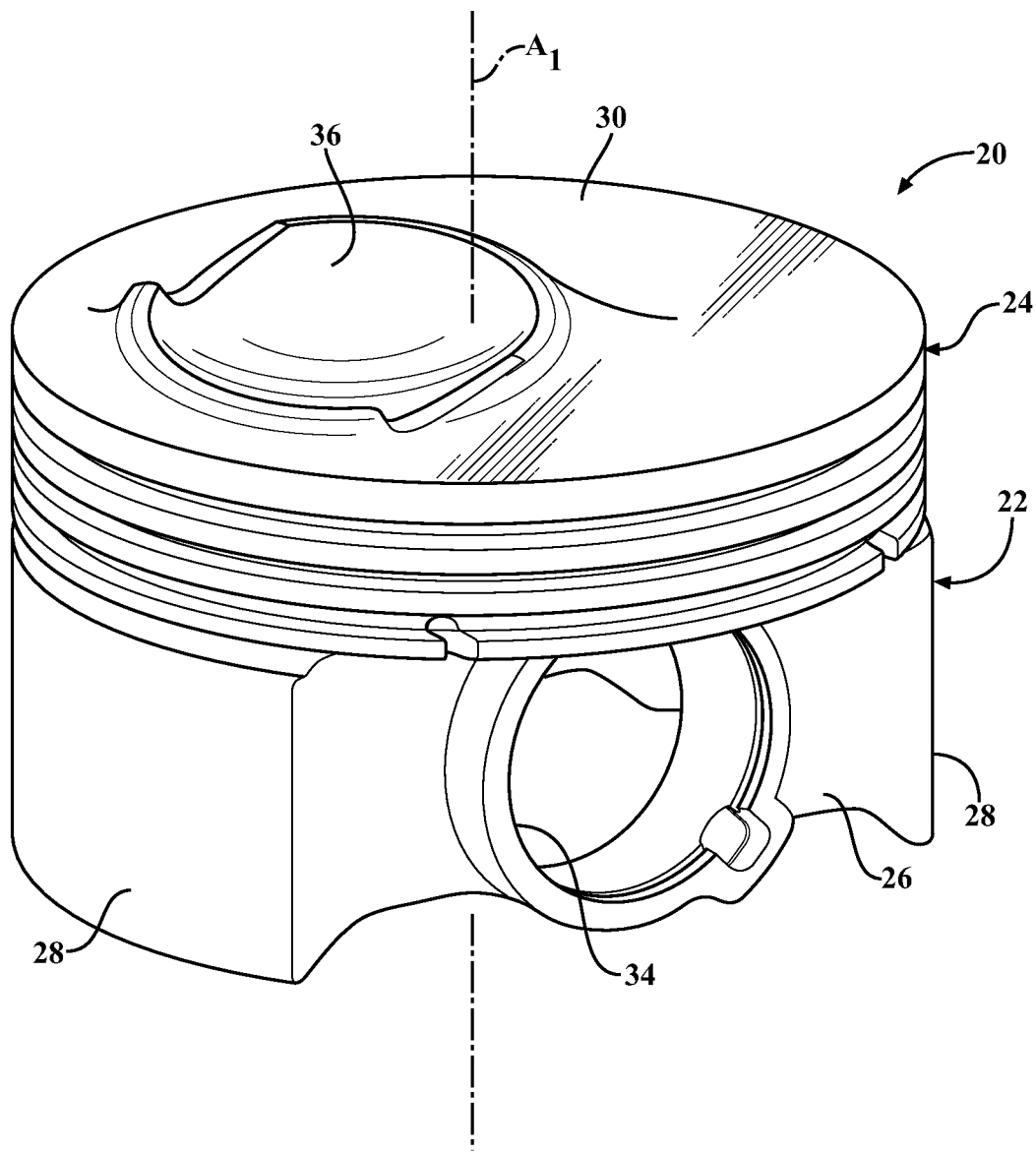
FIG. 1 is a perspective view of a piston constructed in accordance with one aspect of the present invention.
Figure 2:
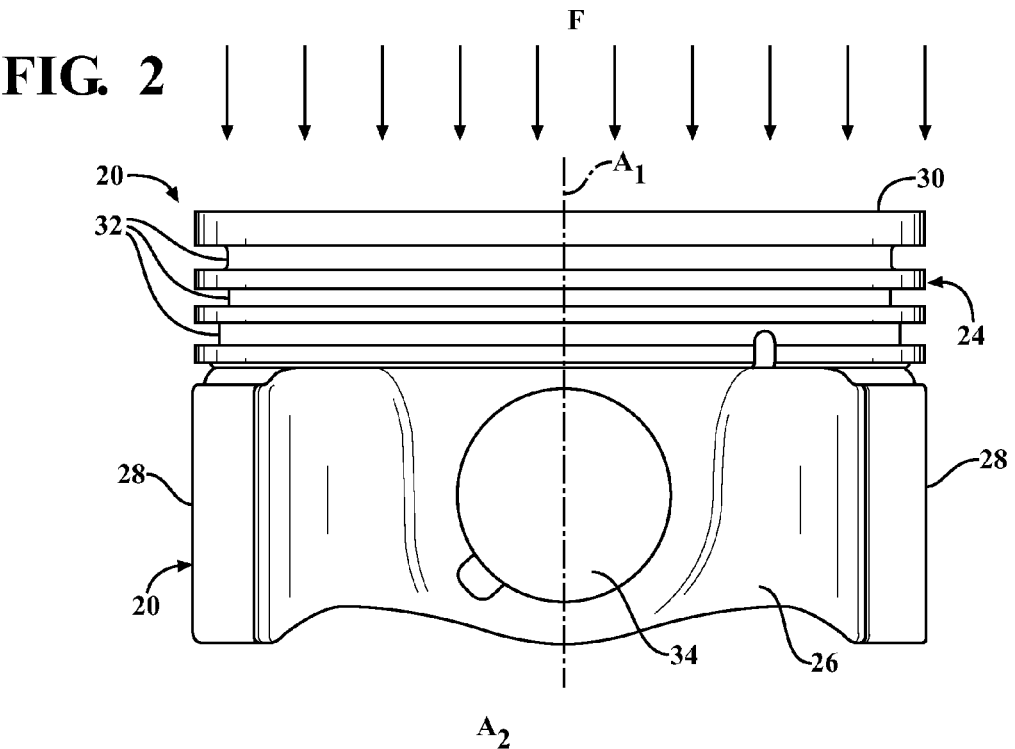
FIG. 2 is a side view of the piston of FIG. 1.

Referring to the drawings, wherein like numerals indicate corresponding parts throughout the several views, a piston 20 constructed in accordance with one presently preferred aspect of the invention, is generally shown in FIGS. 1-5. The piston 20 of the exemplary embodiment is constructed of one integral piece which is preferably cast to a near-final shape then machined to its final dimensions. However, it should be appreciated that the piston 20 could alternately be of multiple pieces which could be shaped and joined to one another through any desirable processes. The piston 20 is preferably formed of an aluminum alloy but could alternately be of steel or any desirable metal or alloy thereof.

Figure 3:
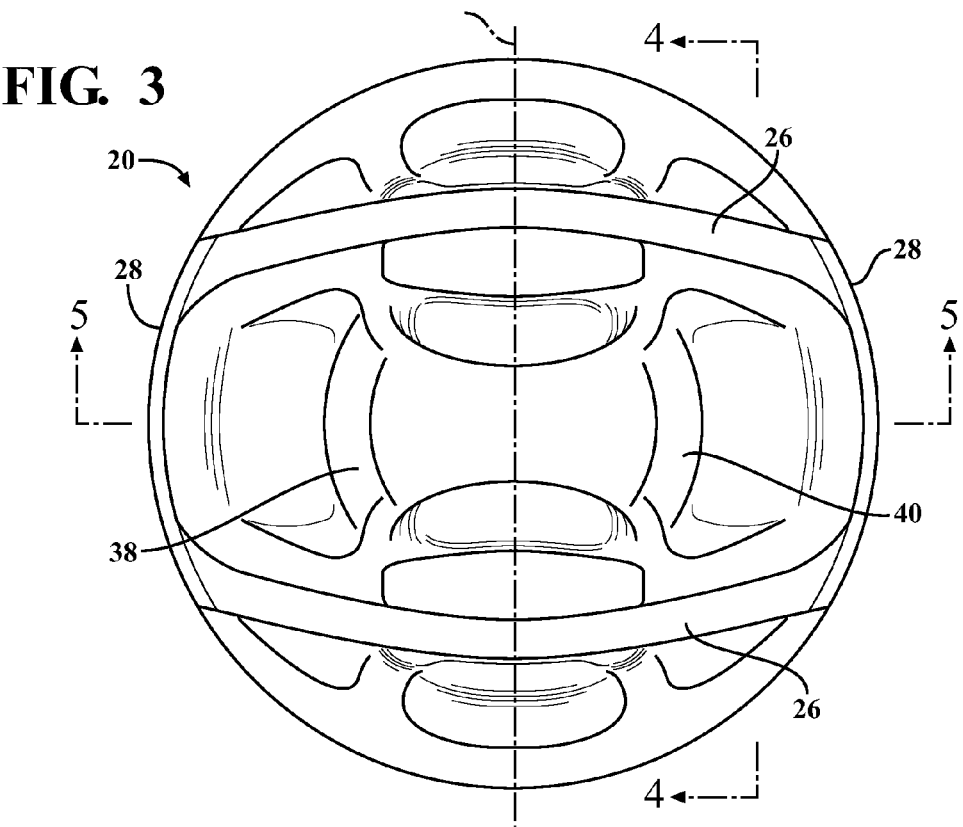
FIG. 3 is a bottom view of the piston of FIG. 1.
Figure 4:
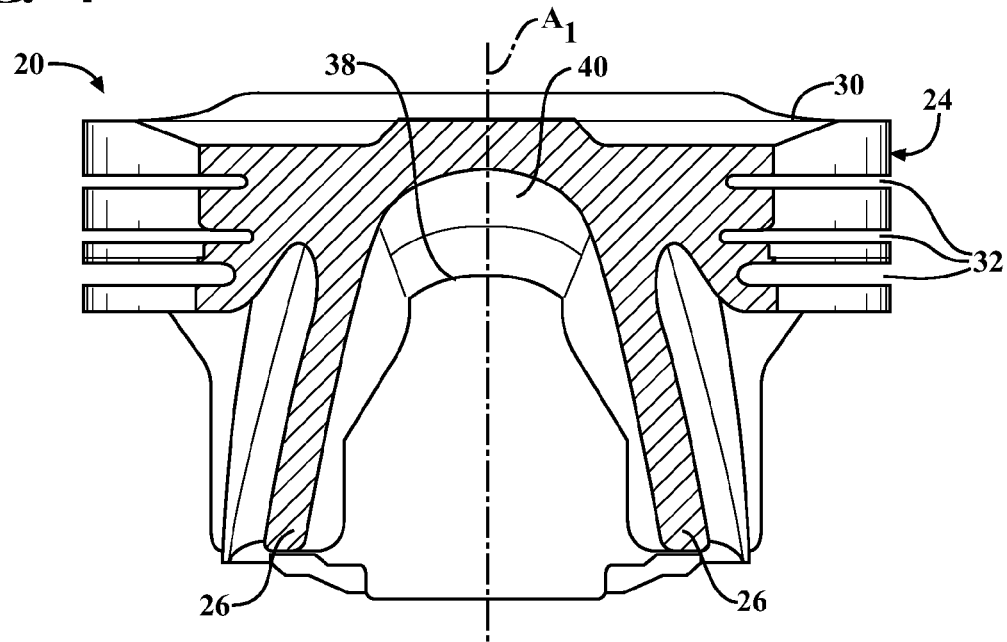
FIG. 4 is a cross-sectional view taken generally along the line 4-4 of FIG. 3.

As shown in FIG. 1, the exemplary one-piece piston 20 has a piston body 22 extending along a longitudinal central axis $A_1$ and having an upper crown portion 24, a pair of pin bosses 26 and a pair of skirt portions 28. The upper crown portion 24 includes a combustion wall 30 and a plurality of ring grooves 32 spaced axially from the combustion wall 30 for receiving piston 20 rings (not shown). The pin bosses 26 extend downwardly along the longitudinal central axis $A_1$ from the upper crown portion 24. Each of the pin bosses 26 has a pin bore 34, and the pin bores 34 are aligned with one another along a pin bore axis $A_2$ (shown in FIG. 3) for receiving a wrist pin (not shown) to interconnect the piston 20 with the small end of a connecting rod (not shown). As best shown in FIG. 3, the skirt portions 28 are disposed diametrically opposite of one another with each skirt portion 28 extending between and interconnecting the pin bosses 26. During operation of the engine, the piston body 22 reciprocates along the longitudinal central axis $A_1$ within a cylinder bore (not shown) of an engine block (not shown) to rotate a crankshaft (not shown) via the connecting rod (not shown).

Referring back to FIG. 1, the combustion wall 30 includes a generally planar portion, a raised portion (pop-up) and a combustion bowl 36 formed therein. The combustion bowl 36 is configured asymmetrically relative to the longitudinal central axis $A_1$, i.e. the center of the combustion bowl 36 is not disposed along the longitudinal central axis $A_1$. However, it should be appreciated that the combustion bowl 36 could alternately be disposed symmetrically about the central axis $A_1$. When the piston 20 is employed in an engine with direct injection technology, combustion of the fuel and gasses in the cylinder bore is often focused around the combustion bowl 36, thereby generating increased pressures and heat at this location. As a result, the combustion bowl 36 is typically the highest stressed area on the crown portion 24 The exemplary piston 20 has an undercrown support structure for strengthening the upper crown portion 24 to resist these forces.

Figure 5:
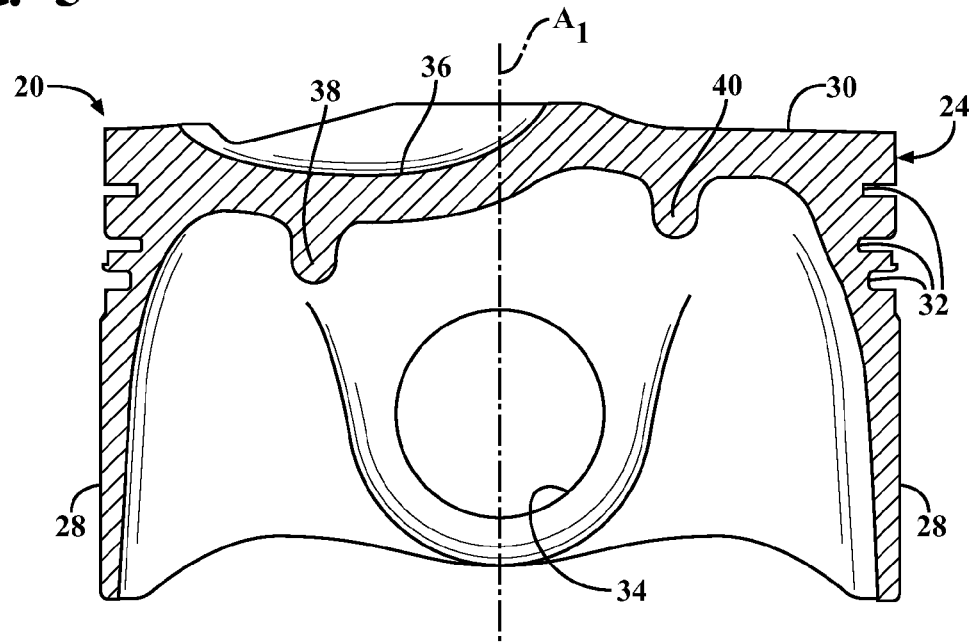
FIG. 5 is a cross-sectional view taken generally along the line 5-5 of FIG. 3.

Referring now to FIG. 3, the piston 20 includes a pair of ribs 38, 40 spaced diametrically from one another and extending generally between the pin bosses 26 to reinforce the upper crown portion 24, thereby enhancing the upper crown portion's 24 resistance to bending about the pin bore axis $A_2$ when the combustion wall 30 is exposed to the increased pressures and temperatures of an engine with direct injection, a turbo-charger and/or a super-charger. This enhanced resistance to bending is achieved without a substantial increase in the mass of the piston 20. In the exemplary embodiment, each of the ribs 38, 40 is generally bowed, or arc-shaped, to increase the area of support beneath the combustion wall 30, thereby further enhancing the upper crown's resistance to bending about the pin bore axis $A_2$. The arc-shape of the ribs 38, 40 also allows the ribs 38, 40 to generally smoothly mate, or be interconnected with, with the opposite pin bosses 26, thereby avoiding the creation of unwanted stresses at the intersection of these elements. Referring now to FIG. 5, each of the ribs 38, 40 depends from and is integrally formed with the upper crown portion 24. Thus, the ribs 38, 40 may be formed "as cast" with the upper crown with little to no additional cost. However, it should be appreciated that the ribs 38, 40 could be formed into the upper crown through any suitable process. In addition to enhancing the upper crown's resistance to bending, the ribs 38, 40 also may function as a heat sink to draw heat away from the combustion wall 30 of the upper crown to cool the combustion wall 30. This heat-sink effect further enhances the piston's 20 resistance to the increased combustion temperatures. It should be appreciated that the ribs could alternately be linearly-shaped or could even arc inwardly, depending on the needs of the particular piston design.

Referring still to FIG. 5, apart from the ribs 38, 40, the combustion wall 30 of the exemplary piston 20 is formed with a generally uniform thickness in both the location of the combustion bowl 36 and in the areas surrounding the combustion bowl 36. One of the ribs 38, 40, hereinafter referred to as a "first rib 38", depends from the combustion wall 30 directly beneath the combustion bowl 36. As such, the first rib 38 is positioned to provide optimal support to the upper crown portion 24 at the location of its highest stresses. The other rib, hereinafter referred to as a "second rib 40", depends from the combustion wall 30 diametrically opposite of the first rib 38 and is spaced from the combustion bowl 36. Since the lower surface of the combustion wall 30 is recessed in the area of the combustion bowl 36, the first rib 38 (which is directly beneath the combustion bowl 36) is recessed relative to the second rib 40, i.e. the first rib 38 extends lower than the second rib 40. Thus, despite the first and second ribs 38, 40 having generally similar lengths, the underside of the combustion wall 30 has an asymmetrical appearance as viewed in cross-section. Additionally, since the exemplary combustion bowl 36 has a generally semi-spherical shape, the first rib 38 arcs not only outwardly away from the pin bore axis $A_2$ but also vertically towards the pin bosses 26 of the piston body 22.

Referring now to FIG. 3, the skirt portions 28 extend generally concentrically with the ribs 38, 40. Thus, the skirt portions 28 have the same or approximately the same radius of curvature as the ribs 38, 40. However, it should be appreciated that the skirt portions 28 do not have to be concentric with the ribs 38, 40.

Obviously, many modifications and variations of the present invention are possible in light of the above teachings. It is, therefore, to be understood that within the scope of any ultimately allowed claims stemming herefrom, the invention may be practiced otherwise than as specifically described.

What is claimed is:

1. A piston, comprising:
a piston body extending along a longitudinal central axis and having a crown portion with an combustion wall and a pair of pin bosses depending from said crown portion; and
said crown portion including at least two ribs formed integrally therewith with each rib depending from said combustion wall, and wherein one of said ribs is spaced from said longitudinal central axis and depends lower in a direction that is parallel with said longitudinal central axis than the other of said ribs which is also spaced from said longitudinal central axis.

2. The piston as set forth in claim 1 wherein each of said ribs extends between said pin bosses.

3. The piston as set forth in claim 2 wherein each of said ribs bows outwardly from said pin bore axis.

4. The piston as set forth in claim 2 wherein each of said ribs bows relative to said longitudinal central axis.

5. The piston as set forth in claim 1 wherein said combustion wall has a combustion bowl and one of said ribs is radially spaced from said combustion bowl.

6. The piston as set forth in claim 5 wherein one of said ribs depends from said combustion wall directly beneath said combustion bowl.

7. The piston as set forth in claim 6 wherein said combustion bowl is generally semi-spherically shaped.

8. The piston as set forth in claim in claim 1 wherein said at least two ribs are disposed diametrically opposite of one another.

9. A piston, comprising:
a piston body extending along a longitudinal central axis and having a crown portion with a combustion wall and a pair of pin bosses depending generally from said crown portion;
said combustion wall of said crown portion including at least one combustion bowl formed therein and wherein said combustion bowl is disposed asymmetrically with respect to said longitudinal central axis; and
said crown portion including at least one rib formed integrally therewith and depending from said combustion bowl directly beneath said at least one combustion bowl and at least one rib which is spaced from said combustion bowl.

10. The piston as set forth in claim 9 wherein said at least one rib extends between said pin bosses.

11. The piston as set forth in claim 10 wherein said at least one rib bows outwardly from said pin bore axis.

12. The piston as set forth in claim 9 wherein said combustion bowl is generally semi-spherically shaped.

* * * * *